United States Patent Office 3,171,834
Patented Mar. 2, 1965

3,171,834
C,C-DIALKYL-DIAZA-CYCLOPROPENES
Siegfried Paulsen, Essen-Kray, Germany, assignor to Bergwerksverband G.m.b.H., Essen, Germany
No Drawing. Filed Sept. 20, 1961, Ser. No. 139,361
Claims priority, application Germany, Sept. 21, 1960, B 59,463
8 Claims. (Cl. 260—239)

This invention relates to novel chemical compounds, in particular, C,C-dialkyl-diaza-cyclopropenes, and to the method of producing such compounds.

A new class of chemical compounds designated as diaza-cyclopropanes was disclosed in copending application Serial No. 843,579 of Georg Huck and Siegfried Paulsen. I have discovered that these diaza-cyclopropanes may be dehydrogenated to produce the corresponding diaza-cyclopropenes, a hitherto unknown class of compounds.

Formerly, the diazo-compounds were considered to be diaza-cyclopropenes, but this assumption has been proved to be erroneous. In the course of later investigations it was discovered that the diazo-compounds have an open chain configuration (R'R'''C=N$_2$ or one of the many mesomeric limiting forms). After considerable research with regard to the diazo-compounds, it was generally believed that compounds having a diaza-cyclopropene ring did not exist at all.

I have found, however, that by treating C,C-dialkyl-diaza-cyclopropanes with a dehydrogenating agent it is possible to produce C,C - dialkyl - diaza - cyclopropenes. The reaction may be described as follows.

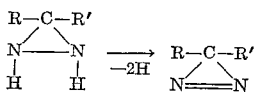

wherein R and R' are selected from the group consisting of methyl, ethyl, n-propyl, isopropyl, n-butyl, isobutyl, and when taken together are pentamethylene.

Particular preferred compounds of the present invention are C,C-diethyl-diaza-cyclopropene and C-methyl-C-ethyl-diaza-cyclopropene. Other valuable compounds include C,C-dimethyl, C,C-methyl-C-isopropyl, C - methyl-C-n-propyl, C-methyl-C-isobutyl-diaza - cyclopropenes, as well as 1,2-diazo-spiro-2,5-octene-1.

Any suitable dehydrogenating agent may be used as, for example, chormium trioxide or an acid solution of potassium dichromate, osmium tetroxide, quinones, such as tetrachloroquinone, potassium permanganate in acid or alkaline solution, as well as yellow mercuric oxide and lead oxide. The dehydrogenation may take place in neutral, alkaline or acid medium. This is surprising inasmuch as diaza-cyclopropanes are hydrolyzed to hydrazine by acids. Particularly good yields are obtained using freshly produced yellow mercuric oxide. This also is particularly astonishing, since recent prior art literature indicated that yellow mercuric oxide did not dehyrogenate diaza-cyclopropanes.

The reaction may be carried out at the various temperature ranges. It is possible to operate at 0° C., at room temperature or at a temperature somewhat above the boiling point of the produced diaza-cyclopropene. If the products boil above 100° C. dehydrogenation may be carried out at about 100° C. because the diaza-cyclopropene will distill off with steam as an azeotropic mixture. It is of particular advantage that the unsaturated reaction products boil at considerably lower temperature than the saturated starting materials as this permits the diaza-cyclopropenes to be continually removed from the reaction vessel.

The reaction is preferably carried out in the presence of a solvent in order to obtain better regulation of the heat of reaction.

It is not necessary, however, to employ a solvent if the starting materials or end products are in liquid form. Any liquid solvent may be used which is not attacked under the conditions of reaction and which will not react with the starting materials. Suitable solvents include the higher ketones, chlorinated hydrocarbons, ethers, etc. The use of water as a solvent is particularly advantageous because most of the diaza-cyclopropanes are soluble in water, but the diaza-cyclopropenes are not. In addition to water, a water insoluble organic solvent may be used. This increases the organic phase and the diaza-cyclopropenes can be more easily separated.

The C,C-dialkyl-diaza-cyclopropanes used as starting materials may be readily prepared by the method proposed in Huck and Paulsen's copending application Serial No. 843,579. According to the method disclosed therein, the diaza-cyclopropanes are prepared by reacting ketones or aldehydes with an excess of ammonia and chlorine.

The C,C - dialkyl - diaza - cyclopropenes are colorless. The lower molecular weight compounds are liquids with a pleasing odor, similar to that of the hydrocarbons. They are very slightly soluble in water, miscible with benzene, ether, alcohol and similar solvents.

The new class of materials are interesting from a chemical point of view because they are isomeric with the diazo-compounds. It was believed for a long time that the structure of the diaza-cyclopropanes was related to that of the diazo-compounds. However, Boersch, Mh. Chem. 65, 331 (1935) and K. Clusius u. U. Luthi, Helv. chim. Acta 40, 445 (1957) independently of each other proved, by completely different methods, that the diazo-compounds possess a linear arrangement of the nitrogen atoms.

The diaza-cyclopropenes are distinguished from the diazo-compounds principally by the following characteristics:

|  | Diazo-Compounds | Diaza-cyclopropenes |
|---|---|---|
| Color | Yellow to red | Colorless. |
| Behavior to diluted acids | N$_2$-development formation of esters. | Stable. |
| First stage of reduction | Hydrazines | Diaza-cyclopropanes. |

The C,C-dialkyl-diaza-cyclopropenes according to the present invention are very reactive because of the double linking and the considerable ring tension which cause them to enter into numerous reactions. This offers many possibilities for the production of compounds having an N—N— linking. Consequently, they are particularly valuable for use as starting materials in the pharmaceutical field.

When producing spongy plastics, the properties of these compounds render them especially suitable as foaming agents or propellent charges.

The invention will be further illustrated by the following examples:

*Example I*

30 parts by weight of freshly produced yellow mercuric oxide are gradually mixed with 10 parts by weight of C,C-diethyl-diaza-cyclopropane within a shaking bulb. The reaction mixture is heated and takes on a dirty greyish-green coloration. The completion of the dehydrogenation is recognizable by the negative reaction of the solution with hydriodic acid. The formed C,C-diethyl-diaza-cyclopropene-1 is then distilled off the shaking bulb. The conversion takes place between 75 and 80° C. Yield 8.9 parts by weight=92% of the theory. If desired, the product may be redistilled. Boiling point 760 mm. Hg: 80–81° C.

It is also possible, however, to filter the reaction mixture or to let it settle and to separate and distill the diaza-cyclopropene at once.

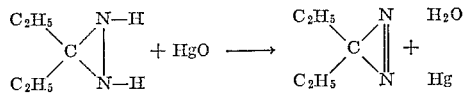

*Example II*

25 parts by weight of fresh yellow mercuric oxide are introduced in a closed agitating vessel containing 50 parts by weight of water. 9 parts by weight of C-methyl-C-ethyl-diaza-cyclopropane are subsequently added in the course of 20 minutes. The reaction vessel is heated on a water bath, the formed C-methyl-C-ethyl-diaza-cyclopropene distilling off at the boiling point of 45–48° C. The product is dried with sodium sulfate and redistilled. The compound is then uniformly converted at 47° C. Yield 7.4 parts by weight=84% of the theory $n_D^{21}$: 1.3658.

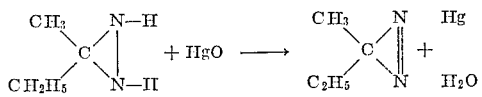

*Example III*

48 parts by weight of freshly produced yellow mercuric oxide and 60 parts by weight of water are placed in a shaking bulb. Then 18 parts by weight of C,C-diethyl-diaza-cyclopropane are gradually added to the suspension of the mercuric oxide. When the dehydrogenation is completed, the organic phase is separated and the aqueous phase is again extracted with 30 parts by weight of ether. The ethereal portions are united and dried by means of calcium chloride. The yield of C,C-diethyl-diaza-cyclopropene-1 amounts to 95% of theory.

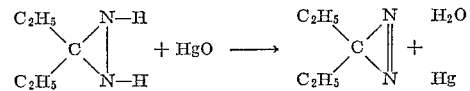

*Example IV*

5 parts by weight of C,C-diethyl-diaza-cyclopropane in 35 parts by weight of water are added in the course of 15 minutes under continuous agitation at 95–98° C. to a solution of 6.0 parts by weight of potassium permanganate and 3.5 parts by weight of potassium hydroxide in 60 parts by weight of water. The formed C,C-diethyl-diaza-cyclopropene is continuously distilled off from the reaction vessel in the course of the reaction. The water which is also distilled off is separated and the reaction product is dried with calcium chloride. Yield 4.6 parts by weight=94% of the theory:

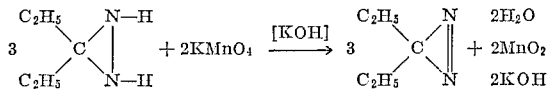

*Example V*

5 parts by weight of C,C-diethyl-diaza-cyclopropane in 30 parts by weight of water are added under agitation in the course of 15 minutes to a solution consisting of 6.4 parts by weight of potassium dichromate in 35 parts by weight of water with 3.0 parts by weight of concentrated hydrochloric acid. The reaction vessel is cooled with ice on the outside of the vessel. The reaction is finished after 20 minutes. The organic phase is then separated from the water and distilled. 4.0 parts by weight of C,C-diethyl-diaza-cyclopropene-1 are obtained. Yield 80% of the theory:

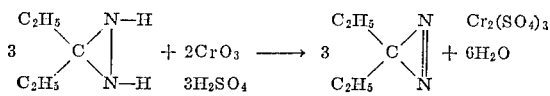

*Example VI*

5 parts by weight of C,C-diethyl-diaza-cyclopropane in 40 parts by weight of water are added in the course of 10 minutes under agitation at 95–98° C. to a solution consisting of 6.4 parts by weight of potassium dichromate in 50 parts by weight of water with 3.0 parts by weight of concentrated sulfuric acid. The formed C,C-diethyl-diaza-cyclopropene-1 is distilled off from the reaction vessel as formed and separated from the water and dried with calcium chloride. Yield 4.3 parts by weight=85% of the theory:

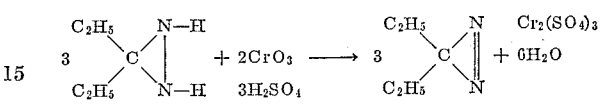

In the same way that diaza-cyclopropenes can be obtained from C-methyl-C-ethyl-diaza-cyclopropane and from C,C-diethyl-diaza-cyclopropane, the corresponding derivatives can also be obtained from the C,C-dimethyl-, C-methyl-C-isopropyl-, C-methyl-C-n-propyl, C-methyl-C-isobutyl-diaza-cyclopropanes, as also from diaza-spiro-[2,5]-octane. Thus C,C-dimethyl, C-methyl-C-isopropyl, C-methyl, C-n-propyl and C-methyl-C-isobutyl-di-aza-propenes and diaza-spiro-[2,5]-octene can be obtained in accordance with the present invention.

*Example VII*

37.5 parts by weight of fresh yellow mercuric oxide are stirred in a reaction flask together with 75 parts by weight of water. Then 11.8 parts by weight of 1,2-diaza-spiro-[2,5]-octane are added in the course of 30 minutes. Subsequently the reaction vessel is heated in the water bath. A binary mixture consisting of 1,2-diaza-spiro-[2,5]-octene-1 and water results at a temperature of 82–93° C. The organic phase is separated from the water, dried with calcium chloride and distilled under vacuo. Yield: 1.3 parts by weight of the theory, boiling point $_{50}$:43° C. Equation of the reaction:

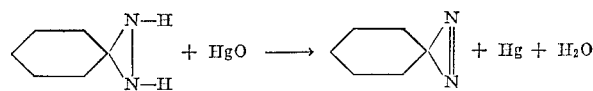

*Example VIII*

40 parts by weight of fresh yellow mercuric oxide containing 15 percent by weight of water and 50 parts by weight of water are introduced into a reaction flask provided with dropping funnel, agitator and reflux cooler. A mixture consisting of 50 parts by weight of water and 9 parts by weight of C,C-dimethyl-diaza-cyclopropane is slowly added from the dropping funnel under continuous agitation. After 30 minutes the upper layer is carefully separated, dried with sodium sulfate and distilled. Yield: 5.9 parts by weight of C,C-dimethyl-diaza-cyclopropene=72% of the theory, boiling point: 19° C.

Equation of the reaction:

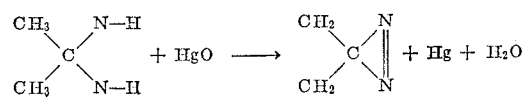

*Example IX*

12 parts by weight of fresh yellow mercuric oxide are stirred in a flask together with 50 parts by weight of water. 4.5 parts by weight of C-methyl-C-isopropyl-diaza-cyclopropane are gradually added. The reaction mixture heats itself slowly. After 25 minutes the reaction is finished. The organic phase is separated from the aqueous layer, dried and rectified. The so produced C-methyl-C-isopropyl-diaza-cyclopropene possesses the following characteristics: yield, 3.7 parts by weight=93% of the theory, boiling point, 71–73° C.

Equation of the reaction:

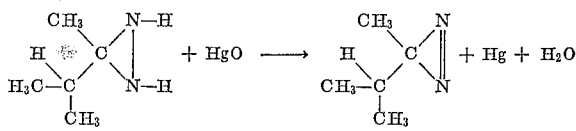

*Example X*

100 parts by weight of water and 30 parts by weight of fresh yellow mercuric oxide are introduced in a flask provided with an agitator. An ethereal solution consisting of 10 parts by weight of C-methyl-C-propyl-diaza-cyclopropane in 80 parts by weight of ether is slowly added into the flask under continuous agitation. After the reaction is finished, the ethereal layer is separated and dried. This solution may already be used for further reactions. By distillation 6.6 parts by weight of C-methyl-C-n-propyl-diaza-cyclopropene=73% of the theory are obtained, boiling point: 79–81° C.

Equation of the reaction:

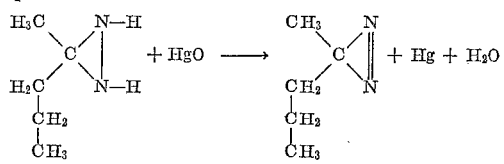

What I claim is:

1. A compound of the formula chemical compound having the structural formula:

wherein R and R' are members elected from the group consisting of methyl, ethyl, n-propyl, isopropyl, n-butyl, isobutyl, and when taken together are pentamethylene.

2. The compound of the formula chemical compound having the structural formula:

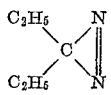

3. The compound of the formula chemical compound having the structural formula:

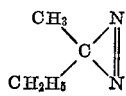

4. The compound of the formula chemical compound having the structural formula:

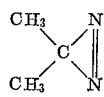

5. The compound of the formula chemical compound having the structural formula:

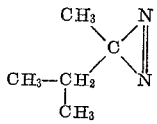

6. The compound of the formula chemical compound having the structural formula:

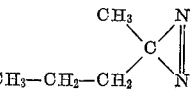

7. The compound of the formula chemical compound having the structural formula:

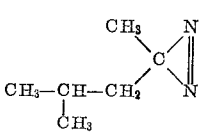

8. The compound of the formula chemical compound having the structural formula:

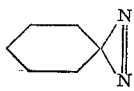

References Cited by the Examiner

Beilstein: Vol. 23, 1936, pp. 1–2.
Groggins: Unit Processes in Organic Synthesis (New York, 1947), pages 627–635.
Sidgwick: Organic Chemistry of Nitrogen, 1937, pp. 347–360.
Staudinger et al.: Berichte, vol. 44, pp. 2197–2212, 1911.

IRVING MARCUS, *Primary Examiner.*

NICHOLAS S. RIZZO, WALTER A. MODANCE,
*Examiners.*